US009641235B2

(12) United States Patent
Bao et al.

(10) Patent No.: US 9,641,235 B2
(45) Date of Patent: May 2, 2017

(54) METHOD AND APPARATUS FOR TRANSMITTING AND RECEIVING CHANNEL STATE INFORMATION

(75) Inventors: Dongshan Bao, Beijing (CN); Shenfa Liu, Beijing (CN)

(73) Assignee: GUANGDONG NUFRONT COMPUTER SYSTEM CHIP CO., LTD., Guangzhou (CN)

( * ) Notice: Subject to any disclaimer, the term of this patent is extended or adjusted under 35 U.S.C. 154(b) by 144 days.

(21) Appl. No.: 14/376,710

(22) PCT Filed: Mar. 23, 2012

(86) PCT No.: PCT/CN2012/072892
§ 371 (c)(1),
(2), (4) Date: Aug. 5, 2014

(87) PCT Pub. No.: WO2013/117032
PCT Pub. Date: Aug. 15, 2013

(65) Prior Publication Data
US 2014/0348106 A1 Nov. 27, 2014

(30) Foreign Application Priority Data

Feb. 6, 2012 (CN) .......................... 2012 1 0025433
Mar. 2, 2012 (CN) .......................... 2012 1 0053117

(51) Int. Cl.
H04B 7/06 (2006.01)
H04L 5/00 (2006.01)

(52) U.S. Cl.
CPC ......... H04B 7/0626 (2013.01); H04B 7/0663 (2013.01); H04L 5/0053 (2013.01)

(58) Field of Classification Search
CPC .. H04B 7/0626; H04B 7/0663; H04B 7/0658; H04B 7/066; H04L 5/0053; H04L 25/0206
See application file for complete search history.

Primary Examiner — Anez Ebrahim
(74) Attorney, Agent, or Firm — Anova Law Group, PLLC

(57) ABSTRACT

The present disclosure provides a method and apparatus for transmitting and receiving Channel State Information. The said transmitting method includes calculating the maximum value $m_H(k)$ of real part and imaginary part of each element in CSI matrix $H_{eff}(k)$ of the sub-carrier; carrying out M bit quantization to $m_H(k)$ to obtain the quantization amplitude $M_H(k)$; calculating the linear portion $M_H^{lin}(k)$ of $M_H(k)$; using $M_H^{lin}(k)$ for carrying out $N_b$ bit quantization to real part and imaginary part of each element in $H_{eff}(k)$ respectively to obtain the quantized CSI matrix $H_{eff}(k)$; $N_b$ being a positive integer; and transmitting said quantization amplitude $M_H(k)$ and said quantized CSI matrix $H_{eff}^q(k)$.

20 Claims, 7 Drawing Sheets

METHOD AND APPARATUS FOR TRANSMITTING AND RECEIVING CHANNEL STATE INFORMATION

CROSS-REFERENCE TO RELATED APPLICATION

This application claims the benefit of Chinese patent application No. 201210025433.3 filed on Feb. 6, 2012 and titled "Method and Apparatus for Transmitting and Receiving Channel State Information", which is incorporated herein by reference in its entirety.

This application claims the benefit of Chinese patent application No. 201210053117.7 filed on Mar. 2, 2012 and titled "Method and Apparatus for Transmitting and Receiving Channel State Information", which is incorporated herein by reference in its entirety.

FIELD OF THE INVENTION

The present disclosure belongs to the field of wireless communication, especially relates to a method and apparatus for quantized channel state information feedback.

BACKGROUND ART OF THE INVENTION

In MIMO system, access point and user station use multiple antennas to obtain the higher rate by the method of spatial multiplexing. Compared with the general method of spatial multiplexing, an enhanced technology is that the user station feeds back Channel State Information (CSI) to the access point, and the access point uses some transmission pre-coding technologies based on the obtained CSI, thus to improve the transmission performance.

There are many methods for obtaining Channel State Information in MIMO systems, generally using the CSI feedback technology. IEEE 802.11n proposes a scheme for providing a quantized feedback CSI matrix, in which an access point initiates the feedback request and a user station gives feedback of sub-carrier matrix $H_{eff}$ on the quantized MIMO channel. The access point calculates the pre-coding matrix $Q_k$ based on the sub-carrier matrix $H_{eff}$. The matrix $H_{eff}$ of CSI includes the equivalent channel between the input from the space mapping of transmitting terminal and the output from the FFT of receiving terminal. In order to facilitate the description of the quantized feedback process, in the following disclosure, a user station is also referred to as a transmitting terminal, and an access point as a receiving terminal.

The specific method of realizing quantized feedback is shown in FIG. 1. In Step S101, the method includes calculating the maximum value of a real part and an imaginary part of each element of CSI matrix $H_{eff}^q(k)$ of the sub-carrier by the transmitting terminal:

$$m_H(k) = \max\{\max\{|Re(H_{eff(m,l)}(k))|_{m=1,l=1}^{m=N_r,l=N_c}\}, \max\{|Im(H_{eff(m,l)}(k))|_{m=1,l=1}^{m=N_r,l=N_c}\}\} \quad (1)$$

wherein $H_{eff(m,l)}(k)$ refers to an element in $H_{eff}(k)$; $Re(H_{eff(m,l)}(k))$ refers to the real part of $H_{eff(m,l)}(k)$; $Im(H_{eff(m,l)}(k))$ refers to the imaginary part of $H_{eff(m,l)}(k)$; m is a line position parameter; l is a column position parameter; $N_r$ is the maximum line number; $N_c$ is the maximum column number; $1 \leq m \leq N_r$, $1 \leq l \leq N_c$, $N_r \geq 1$, $N_c \geq 1$ m, l, $N_r$ and $N_c$ are positive integers; and k is a position parameter of the sub-carrier, which may be a serial number.

In Step S102, the method includes carrying out 3-bit quantization to the relative value $$\frac{\max\{m_H(z)\}_{z=-N_{SR}}^{z=N_{SR}}}{m_H(k)} \text{ of } m_H(k)$$

by said transmitting terminal to obtain the quantization result $M_H(k)$ $$M_H(k) = \min\left\{7, \left\lfloor 20\log_{10}\left(\frac{\max\{m_H(z)\}_{z=-N_{SR}}^{z=N_{SR}}}{m_H(k)}\right)\right\rfloor\right\} \quad (2)$$

wherein $\max\{m_H(z)\}_{z=N_{SR}}^{z=SR}$ is the maximum amplitude value Alpha, $\lfloor x \rfloor$ is the maximum integer not exceeding x; and NSR is the subscript of the maximum data sub-carrier.

In Step S103, the method includes calculating the linear portion $M_H^{lin}(k)$ of $M_H(k)$ of said transmitting terminal:

$$M_H^{lin}(k) = \frac{\max\{m_H(z)\}_{z=-N_{SR}}^{z=N_{SR}}}{10^{M_H(k)/20}} \quad (3)$$

In Step S104, the method includes carrying out Nb bit quantization to the real part and imaginary part of each element in $H_{eff}(k)$ matrix respectively by said transmitting terminal:

$$H_{eff(m,l)}^{q(R)} = \text{round}\left(\frac{Re(H_{eff(m,l)}(k))}{M_H^{lin}(k)}(2^{N_b-1}-1)\right) \quad (4)$$

$$H_{eff(m,l)}^{q(I)}(k) = \text{round}\left(\frac{Im(H_{eff(m,l)}(k))}{M_H^{lin}(k)}(2^{N_b-1}-1)\right) \quad (5)$$

In Step S105, the method includes feeding back Alpha, $M_H(k)$ and quantized $H_{eff}^q(k)$ to the receiving terminal by said transmitting terminal. In Step S106, the method includes receiving Alpha, $M_H(k)$ and quantized $H_{eff}^q(k)$ by said receiving terminal.

In Step S107, the method includes calculating the linear value according to $M_H(k)$ by said receiving terminal as follows:

$$r(k) = 10^{M_H(k)/20} \quad (6)$$

In Step S108, the method includes scaling the real part $H_{eff(m,l)}^{q(R)}(k)$ and imaginary part $H_{eff(m,l)}^{q(I)}(k)$ of each element $H_{eff(m,l)}^q(k)$ in $H_{eff}^q(k)$ according to Alpha and r(k) by said receiving terminal, thus to recover the CSI matrix (also known as H matrix):

$$Re\{\tilde{H}_{eff(m,l)}(k)\} = \frac{\max\{m_H(z)\}_{z=-N_{SR}}^{z=N_{SR}} H_{eff(m,l)}^{q(R)}(k)}{r(k)(2^{N_b-1}-1)} \quad (7)$$

-continued $$\text{Im}\{\tilde{H}_{eff(m,l)}(k)\} = \frac{\max\{m_H(z)\}_{z=-N_{SR}}^{z=N_{SR}} H_{eff(m,l)}^{q(I)}(k)}{r(k)(2^{N_b-1}-1)}$$

Through the de-coding process (formula 7) of quantized CSI matrix from the receiving terminal, it can be determined that the feedback overhead required under the method of CSI matrix quantized feedback is the sum of the required bit number of Alpha, $M_H(k)$ and the quantized $H_{eff}^q(k)$. $N_{Alpha}+3+2 \times N_b \times N_r \times N_c$.

SUMMARY OF THE INVENTION

The technical problem to be solved in the present disclosure is to provide a method and apparatus for transmitting and receiving of Channel State Information. Embodiments consistent with the present disclosure provide a new scheme of CSI quantized feedback, thus reduce both algorithm complexity and feedback overhead while maintaining the quantized feedback performance.

On aspect of the present disclosure provides a method for transmitting Channel State Information. The method includes determining the maximum value $m_H(k)$ in a real part and an imaginary part of each element in CSI matrix $H_{eff}(k)$ of the sub-carrier and determining M bit quantization of $m_H(k)$ to obtain the quantization amplitude $M_H(k)$. M is a positive integer. The method further includes determining the linear portion $M_H^{lin}(k)$ of $M_H(k)$ and determining $N_b$ bit quantization of a real part and an imaginary part of each element in $H_{eff}(k)$ based on $M_H^{lin}(k)$, to obtain the quantized CSI matrix $\tilde{H}_{eff}^q(k)$. $N_b$ is a positive integer. The method further includes transmitting said quantization amplitude $M_H(k)$ and said quantized CSI matrix $H_{eff}^q(k)$.

Another aspect of the present disclosure also provides a method for receiving Channel State Information. The method includes receiving the quantized CSI matrix $H_{eff}^q(k)$ and quantization amplitude $M_H(k)$ of the sub-carrier; recovering amplitude value $r(k)$ according to $M_H(k)$; and scaling a real part and an imaginary part of each element in $H_{eff}^q(k)$ according to $r(k)$, to recover the CSI matrix $\tilde{H}_{eff}(k)$ of the sub-carrier.

Another aspect of the present disclosure provides an apparatus for transmitting Channel State Information. The apparatus includes a first operation module, configured to determine the maximum value $m_H(k)$ of a real part and an imaginary part of each element in CSI matrix $H_{eff}(k)$ of a sub-carrier; a first quantization module, configured to determine M bit quantization to $m_H(k)$ to obtain the quantization amplitude $M_H(k)$, and M is positive integer; a second operation module, configured to determine the linear portion $M_H^{lin}(k)$ of $M_H(k)$; and a second quantization module, configured to determine $N_b$ bit quantization to real part and imaginary part of each element in $H_{eff}(k)$ respectively by $M_H^{lin}(k)$, thus to obtain the quantized CSI matrix $H_{eff}^q(k)$. $N_b$ is a positive integer. The apparatus further includes a transmitting module, used for transmitting said quantization amplitude $M_H(k)$ and said quantized CSI $H_{eff}^q(k)$.

The present disclosure provides a method and apparatus for transmitting and receiving of Channel State Information. The present disclosure provides a new scheme of CSI quantized feedback, and reduces both algorithm complexity and feedback overhead while maintaining the quantized feedback performance.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

First Embodiment

Through research and experiments, the embodiment of the present disclosure provides a new method for quantized feedback of CSI. Specific descriptions of the method are given below from transmitting side and receiving side respectively. The disclosed method shown in FIGS. 2 and 3 may be implemented in a MIMO (multiple-input and multiple-output) system for multiplying the capacity of a radio link using multiple transmit and receive antennas to exploit multipath propagation. In MIMO system, an access point and a user station use multiple antennas to increase data rates. The user station and the access point may be respectively implemented by a computation terminal including at least a processor, a memory, and one or more antennas. In some embodiments, the user station may be the terminal calculating the Channel State Information (CSI) matrix in response to a CSI feedback request from the access point, and transmitting quantized feedback of CSI to the access point. The user station may also be referred as transmitting terminal. The access point may be the terminal receiving the quantized feedback of CSI and recovering the CSI matrix. The access point may also be referred as receiving terminal.

Figure 1:
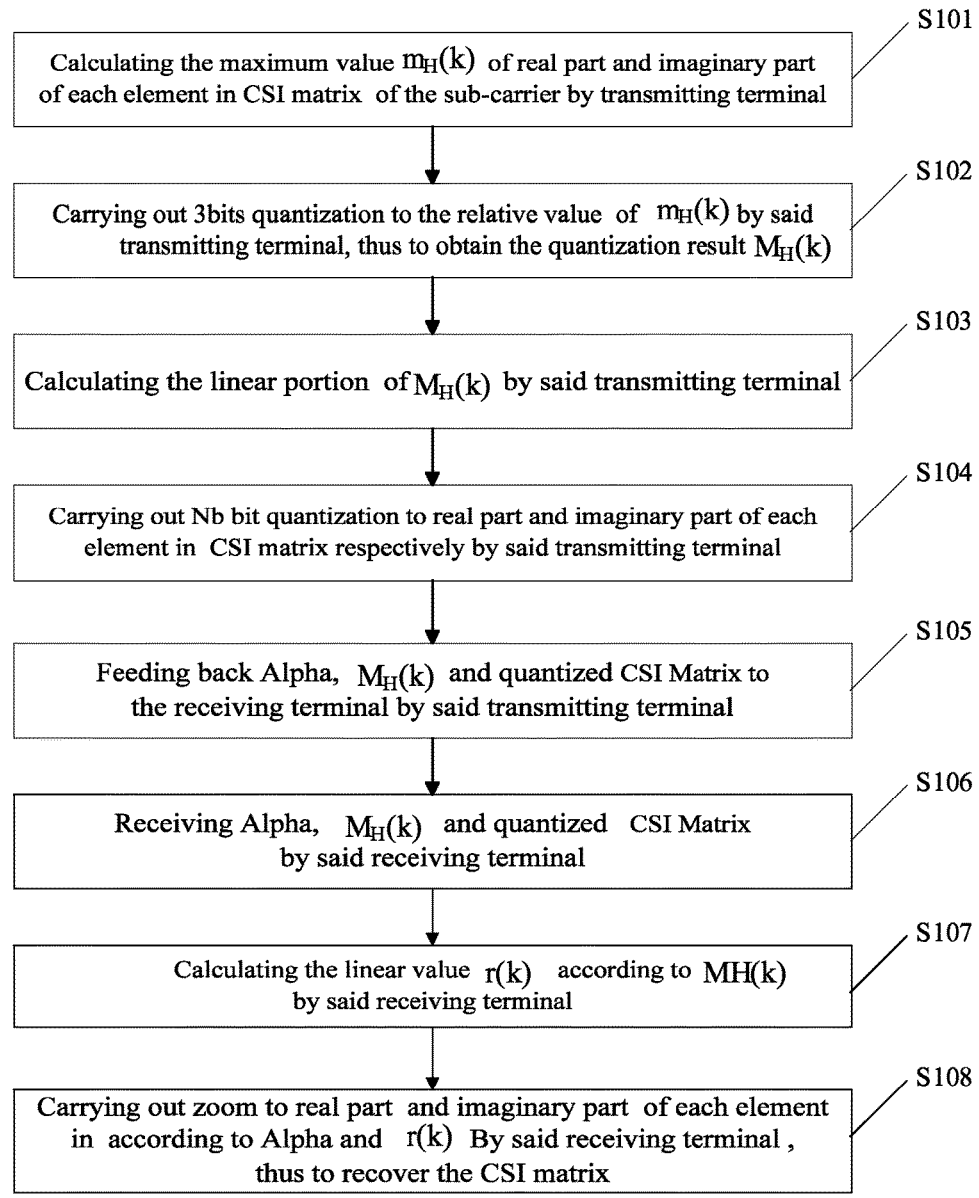
FIG. 1 is the flow chart of a method for quantized feedback of Channel State Information defined by 802.11.
Figure 2:
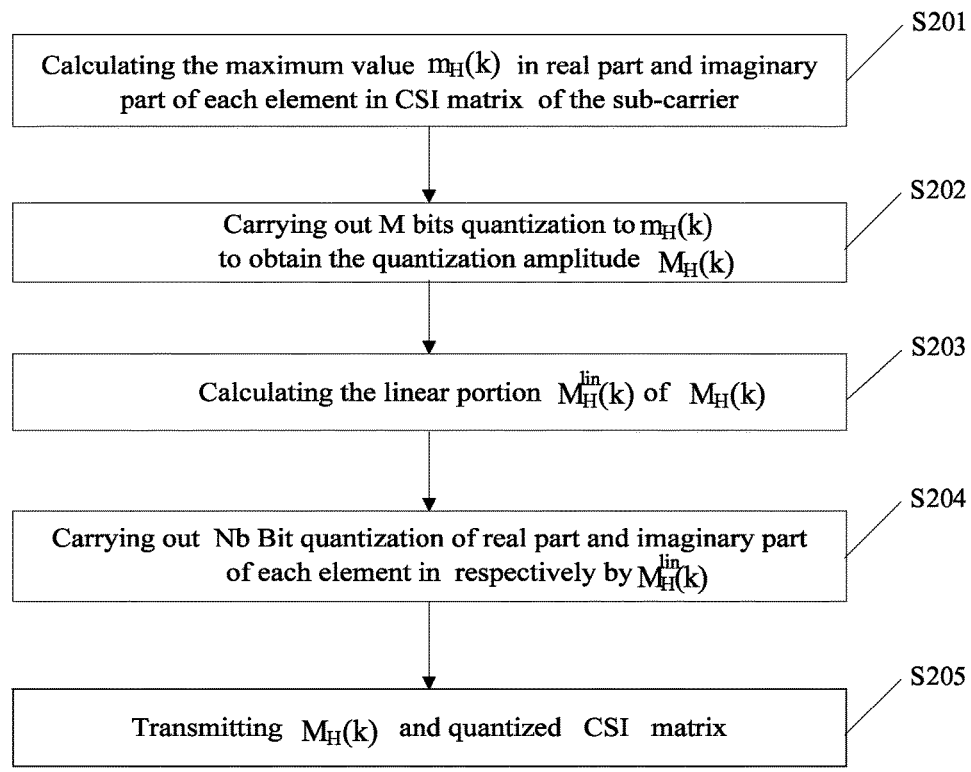
FIG. 2 is the flow chart of a method for transmitting the Channel State Information in the first embodiment of the present disclosure.
Figure 3:
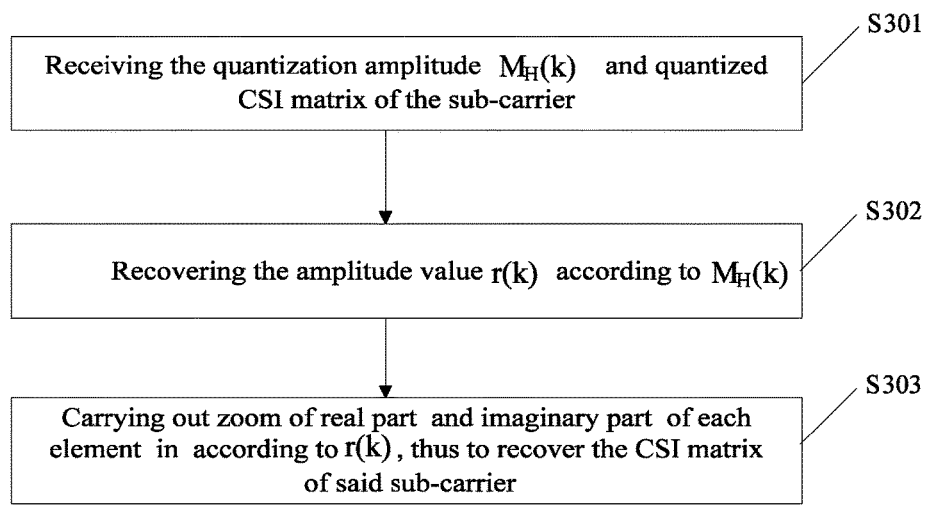
FIG. 3 is the flow chart of a method for receiving the Channel State Information in the first embodiment of the present disclosure.
Figure 4:
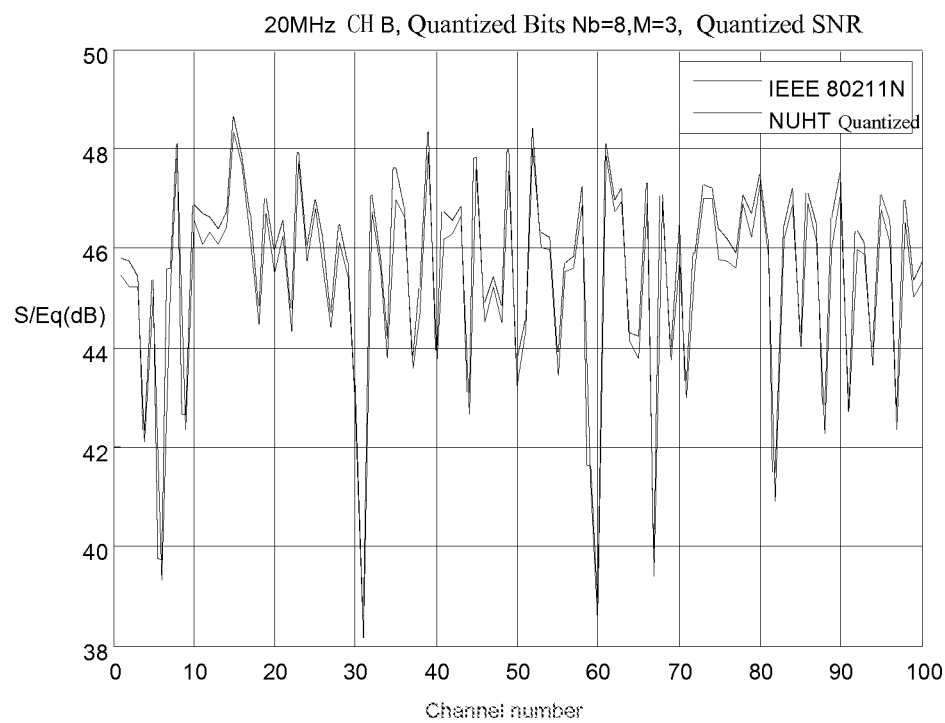
FIG. 4 illustrates the comparison result of signal to noise ratio between the method for quantized feedback Channel State Information in the first embodiment of the present disclosure and the method for quantized of Channel State Information of 802.11 on channel B at 20 MHz.

FIG. 2 shows a method for transmitting Channel State Information, including the following steps.

Step S201: Calculating the maximum value $m_H(k)$ in real part and imaginary part of each element in CSI matrix $H_{eff}(k)$ of the sub-carrier. Specifically, it can be determined by the following formula:

$$m_H(k) = \max\{\max\{|Re(H_{eff(m,l)}(k))|_{m=1,l=1}^{m=N_r,l=N_c}\}, \max\{|Im(H_{eff(m,l)}(k))|_{m=1,l=1}^{m=N_r,l=N_c}\}\} \quad (8)$$

wherein $H_{eff(m,l)}(k)$ refers to an element in $H_{eff}(k)$; $Re(H_{eff(m,l)}(k))$ refers to the real part of $H_{eff(m,l)}(k)$; $Im(H_{eff(m,l)}(k))$ refers to the imaginary part of $H_{eff(m,l)}(k)$; m is a line position parameter; l is a column position parameter, $N_r$ is the maximum line number; $N_c$ is the maximum column number; $1 \leq m \leq N_r$, $1 \leq l \leq N_c$, $N_r \geq 1$, $N_c \geq 1$, m, l; $N_r$ and $N_c$ are positive integers; k is position parameter of the sub-carrier, which may be in serial form.

$H_{eff}^q(k)$ is obtained by the user station through the channel estimation according to CSI feedback request. Its line number thereof is $N_r$; column number is $N_c$. The number of transmitting antennas of access point (AP) is equal to $N_c$, which is obtained during the process of capacity negotiation between the user station and access point. $N_r$ is allocated by the access point, which is carried in the CSI feedback request and transmitted to the user station when the CSI feedback request is initiated.

Step S202: Carrying out M bits quantization to $m_H(k)$ to obtain the quantization amplitude $M_H(k)$. Specifically, it can be achieved by use of the following formula:

$$M_H(k) = \min\{2^M - 1, f(g(m_H(k)))\} \quad (9)$$

wherein $g(m_H(k))$ is the function to map the linear $m_H(k)$ to the interval expressed by the logarithm; and $f(g(m_H(k)))$ is the round operation of the calculation result of $g(m_H(k))$. The round operation may be the top round operation (expressed by $\lfloor \ \rfloor$), down round operation (expressed by $\lceil \ \rceil$) or a "normal" round (round up at 5, down at 4) operation.

$M_H(k)$ is used for obtaining the minimum value between $(2^M-1)$ and $f(g(m_H(k)))$, and for limiting the amplitude of the quantization result to ensure the quantization accuracy. M refers to number of quantized bits, which is a positive integer. M could be a positive integer greater than or equal to 2. For comprehensive consideration of performance and overhead, preferably, M=3 in the first embodiment of the present disclosure.

Optionally, $g(m_H(k)) = \max(0, a \cdot \log_b(m_H(k)) + c)$ could be used, wherein a, b and c are positive real numbers. Optionally, a=4.11, b=2, c=0 could be used, thus to make the CSI quantized feedback performance reach the preferred result. Optionally, a=13.67, b=10, c=0 also could make the CSI quantized feedback performance reach the preferred result.

Step S203: Calculating the linear portion $M_H^{lin}(k)$ of $M_H(k)$. Specifically, it can be achieved by using the following formula:

$$M_H^{lin}(k) = b^{M_H(k)/a} \quad (10)$$

Step S204: Carrying out $N_b$ bit quantization of a real part and an imaginary part of each element in $H_{eff}(k)$ respectively by $M_H^{lin}(k)$. Specifically, it can be achieved by using the following formula:

$$H_{eff(m,l)}^{q(R)} = \text{sign}(H_{eff(m,l)}(k)) * \quad (11)$$
$$\min\left(2^{N_b-1} - 1, \text{round}\left(\frac{|Re(H_{eff(m,l)}(k))|}{M_H^{lin}(k) - c}(2^{N_b-1} - 1)\right)\right)$$

$$H_{eff(m,l)}^{q(I)} = \text{sign}(H_{eff(m,l)}(k)) *$$
$$\min\left(2^{N_b-1} - 1, \text{round}\left(\frac{|Im(H_{eff(m,l)}(k))|}{M_H^{lin}(k) - c}(2^{N_b-1} - 1)\right)\right)$$

wherein $H_{eff(m,l)}(k)$ refers to the element in $H_{eff}(k)$; $H_{eff(m,l)}^{q(R)}$ refers to the real part of quantized $H_{eff(m,l)}(k)$; $H_{eff(m,l)}^{q(I)}(k)$ refers to the imaginary part of quantized $H_{eff(m,l)}(k)$; m is line position parameter, l is column position parameter; $\text{sign}(H_{eff(m,l)}(k))$ refers to the sign polarity of between $(2^{N_b-1}-1)$ and $$\text{round}\left(\frac{|Re(H_{eff(m,l)}(k))|}{M_H^{lin}(k) - c}(2^{N_b-1} - 1)\right);$$

round indicates round operation; "| |" indicates absolute operation; and $N_b$ is a positive integer.

Through obtaining the minimum value between $(2^{N_b-1}-1)$ and $$\left(\frac{|Re(H_{eff(m,l)}(k))|}{M_H^{lin}(k) - c}(2^{N_b-1} - 1)\right)$$

and limiting the amplitude of the quantization result, the method ensures the quantization accuracy. Considering the absolute operation used during quantization, the sign polarity (namely the positive and negative of the sign) is added back by multiplying by $\text{sign}(H_{eff(m,l)}(k))$.

$N_b$ is calculated by the user station based on the quantified overhead, which is calculated by the resource allocation information and feedback MCS level carried in CSI feedback request. $N_b$ is a positive integer, with some values provided (4, 5, 6, 8, 10 and 12), which could be selected based on different quantitative accuracy requirements specifically.

Step S205: Transmitting $M_H(k)$ and quantized $H_{eff}^q(k)$ matrix. Preferably, in case of CSI matrix feedback, the transmitting terminal could take the sub-carrier set that needs quantized feedback as a unit, to transmit the quantized CSI matrix of each sub-carrier in said set together with $M_H(k)$. Said sub-carrier set that needs quantized feedback is indicated by the CSI feedback request initiated by the access point.

Correspondingly, the embodiment of the present disclosure also provides a method for receiving Channel State Information, and carrying out reverse processing of the quantized CSI matrix $H_{eff}^q(k)$ to recover the CSI matrix. The method shown in FIG. 3, includes the following steps.

Step S301: Receiving the quantization amplitude $M_H(k)$ and quantized CSI matrix $H_{eff}^q(k)$ of the sub-carrier.

Step S302: Recovering the amplitude value r(k) according to $M_H(k)$. Specifically, the method includes the step of carrying out reverse processing according to the method for quantizing $M_H(k)$ to recover r(k). For instance, when $M_H(k)$ adopts quantization of $M_H(k)=\min\{2^M-1, f(g(m_H(k)))\}$, the following formula could be used for calculating r(k).

$$r(k)=g^{-1}(M_H(k))=b^{M_H(k)/a}-c \qquad (12)$$

wherein $g^{-1}(M_H(k))$ is the inverse function of $g(m_H(k))$; and a and b are positive real numbers. $g(m_H(k))$ and its inverse function $g^{-1}(M_H(k))$ are pre-negotiated at the transmitting terminal and receiving terminal and stored locally.

Step S303: Carrying out zoom of real part $H_{eff(m,l)}^{q(R)}(k)$ and imaginary part $H_{eff(m,l)}^{q(I)}(k)$ of each element $\tilde{H}_{eff(m,l)}^{q}(k)$ in $H_{eff}^{q}(k)$ according to r(k), thus to recover the CSI matrix $\tilde{H}_{eff}(k)$ of said sub-carrier. Specifically, it can be achieved by use of the following formula:

$$\operatorname{Re}(\tilde{H}_{eff(m,l)}(k)) = \frac{r(k)H_{eff(m,l)}^{q(R)}(k)}{(2^{N_b-1}-1)} \qquad (13)$$

$$\operatorname{Im}(\tilde{H}_{eff(m,l)}(k)) = \frac{r(k)H_{eff(m,l)}^{q(I)}(k)}{(2^{N_b-1}-1)}$$

Comparing the scheme in the first embodiment of the present disclosure and that of 802.11, there are a few differences.

Regarding the algorithm realization complexity, the calculation of $M_H(k)$ and its linear value in 802.11 scheme needs division operation of $m_H(k)$. The algorithm complexity of the technical scheme provided in the present disclosure is lower with less operation amount.

Regarding the feedback overhead, in the above CSI matrix feedback coding process (S201~S205) of the transmitting terminal in the present disclosure, the feedback overhead required under the method of CSI matrix quantized feedback is the sum of the required bit number of $M_H(k)$ and the quantized $H_{eff}^{q}(k)$: $M+2\times N_b\times N_r\times N_c$. The overhead of embodiments of the present disclosure is $N_{Alpha}$ less than that in the scheme defined by 802.11. As shown in Table 1, comparing the 802.11 scheme with the scheme for the first embodiment of the present disclosure in terms of feedback overhead, because both schemes aim at the quantization of real part and imaginary part, both adopt the same quantization bits Nb. The scheme in the first embodiment of the present disclosure does not need to give feedback of Alpha value. Therefore, the feedback overhead of the scheme for the first embodiment of the present disclosure is less.

TABLE 1

Feedback Overhead

| | Feedback Overhead |
|---|---|
| IEEE 802.11n | $B_{feedback} = N_{feedback}(\text{scaleB} + N_{tx}N_{rx}(\text{realB} + \text{imagB})) + N_{Alpha})$<br>scaleB = M(bits)<br>realB = imagB = $N_b$(bits) |
| Present disclosure Scheme 1 | $B_{feedback} = N_{feedback} \cdot (\text{scaleB} + N_{tx}N_{rx}(\text{realB} + \text{imagB}))$<br>scaleB = M(bits)<br>realB = imagB = $N_b$(bits) |

Here, $B_{feedback}$ is the feedback overhead; $N_{feedback}$ is the number of elements in feedback sub-carrier set $\Omega_{feedback}$; scaleB is the quantization bit of $M_H(k)$. $N_{tx}$ is the number of CAP transmitting antennas; $N_{rx}$ is the number of STA receiving antennas; realB is the quantization accuracy of the real part; and imagB is the quantization accuracy of the imaginary part.

Figure 5:
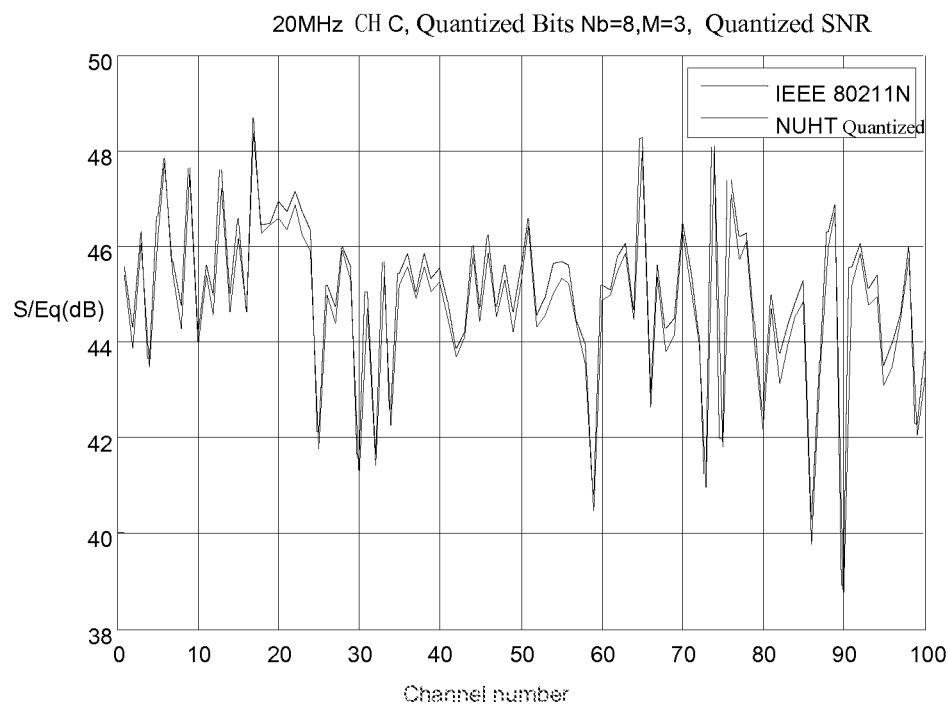
FIG. 5 illustrates the comparison result of signal to noise ratio between the method for quantized feedback of Channel State Information in the first embodiment of the present disclosure and the method for quantized feedback of Channel State Information of 802.11 on channel C at 20 MHz.
Figure 6:
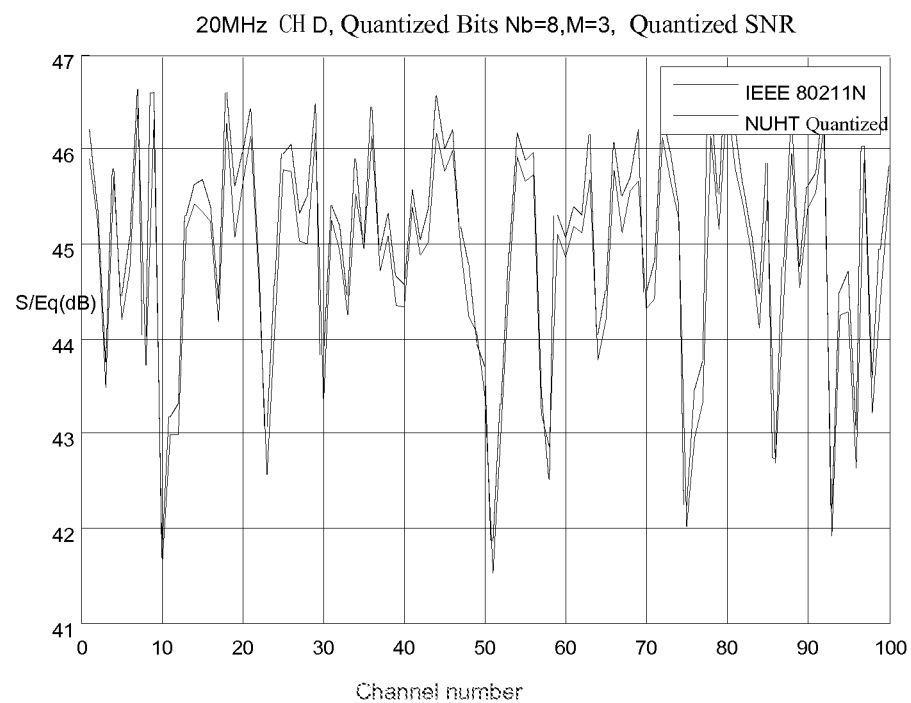
FIG. 6 illustrates the comparison result of signal to noise ratio between the method for quantized feedback of Channel State Information in the first embodiment of the present disclosure and between the method for quantized feedback method of Channel State Information of 802.11 on channel D at 20 MHz.
Figure 7:
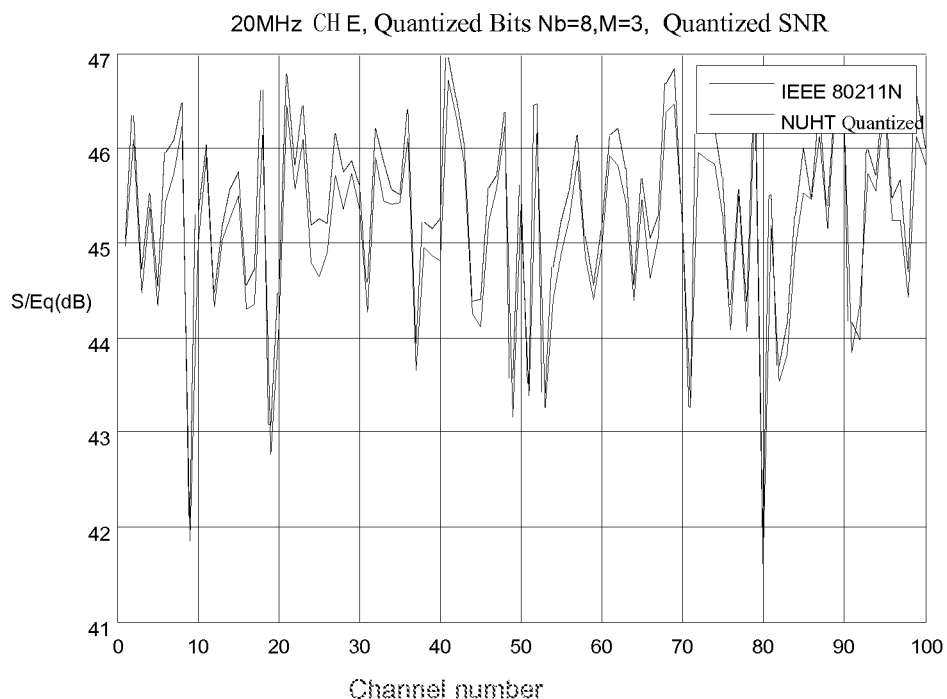
FIG. 7 illustrates the comparison result of signal to noise ratio between the method for quantized feedback of Channel State Information in the first embodiment of the present disclosure and between the method for quantized feedback method of Channel State Information of 802.11 on channel E at 20 MHz.

Regarding the feedback performance, the first embodiment of the present disclosure first selects $M_H(k)=\min\{2^M-1, \operatorname{round}(4.11\cdot\log_2(m_H(k)))\}$, a=4.11, b=2, c=0, $N_b$=8, M=3. FIG. 4 to FIG. 7 show the comparisons of quantized signal to noise ratio of the CSI quantization algorithm provided in the first embodiment of the present disclosure with that by CSI quantization algorithm provided by IEEE802.11n. Referring to FIG. 4 to FIG. 7 for the comparison result of both on different channels, FIG. 4 indicates the comparison result of the quantized signal to noise ratio of both on Channel B at 20 MHz; FIG. 5 indicates the comparison result of the quantized signal to noise ratio of both on Channel C at 20 MHz; FIG. 6 indicates the comparison result of quantized signal to noise ratio of both on Channel D at 20 MHz; and FIG. 7 indicates the comparison result of quantized signal to noise ratio of both on Channel E at 20 MHz. It can be seen from the Figures, the performances of both schemes are the same or similar.

Figure 8:
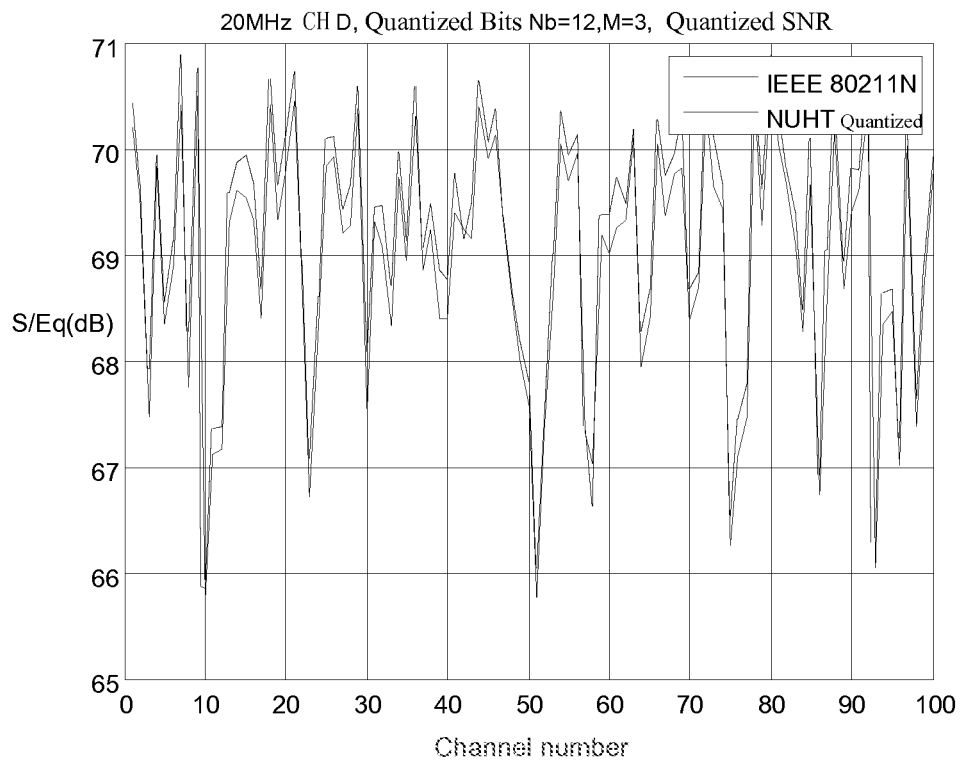
FIG. 8 illustrates the comparison result of the signal to noise ratios after adjustment of $N_b=12$ based on FIG. 6.
Figure 9:
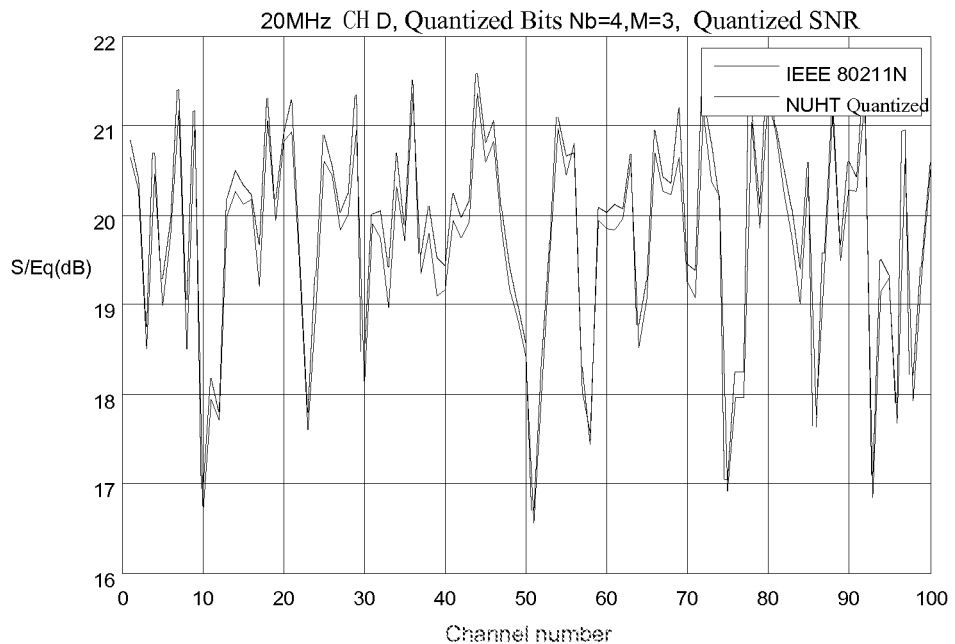
FIG. 9 illustrates the comparison result of the signal to noise ratios after adjustment of $N_b=4$ based on FIG. 6.
Figure 10:
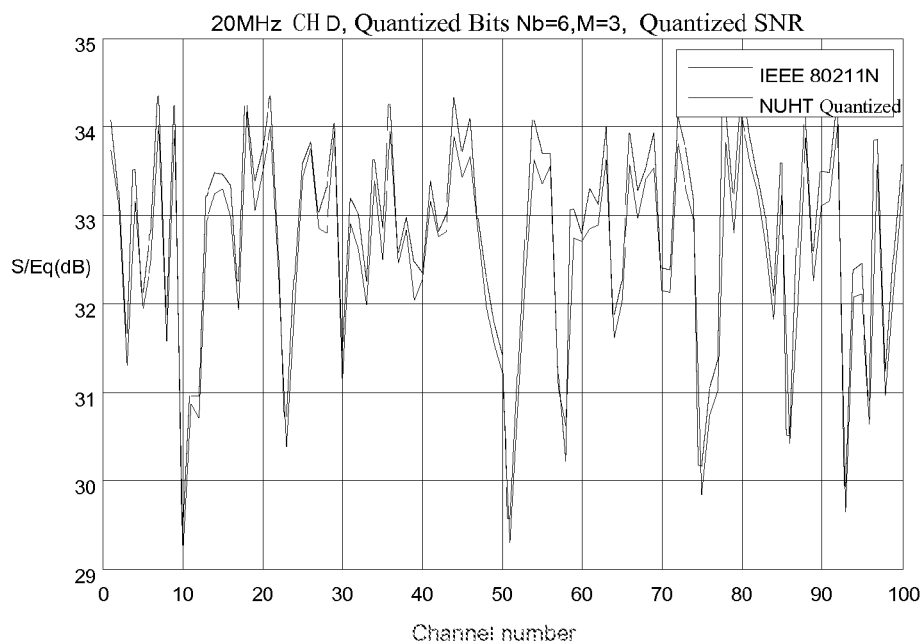
FIG. 10 illustrates the comparison result of the signal to noise ratios after adjustment of $N_b=6$ based on FIG. 6.

When adjusting the value of parameter $N_b$ of the scheme in the first embodiment of the present disclosure, and selecting $M_H(k)=\min\{2^M-1, \operatorname{round}(4.11\cdot\log_2(m_H(k)))\}$, a=4.11, b=2, c=0, $N_b$=12, M=3, FIG. 8 shows the comparison result for both on channel D at 20 MHz. When other parameters are not changed, adjust $N_b$=4, FIG. 9 shows the comparison result for both on channel D at 20 MHz. When other parameters are not changed, adjust $N_b$=6, FIG. 10 shows the comparison result for both on channel D at 20 MHz. It can be seen from FIG. 8 to FIG. 10 that the performances of both schemes are still the same or similar.

Figure 11:
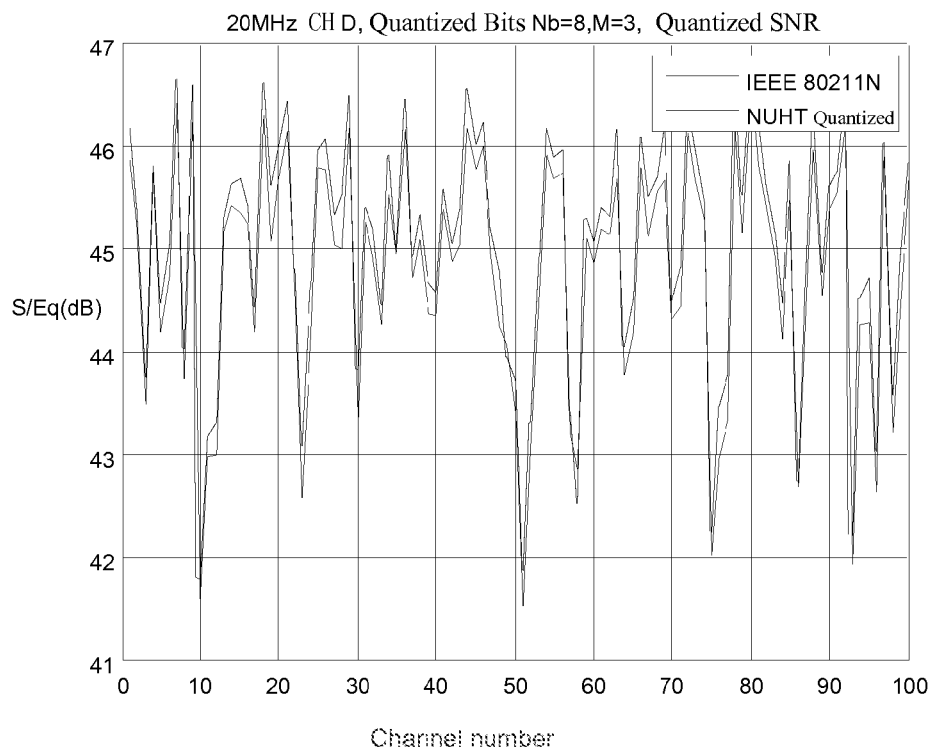
FIG. 11 illustrates the comparison result of the signal to noise ratios after adjustment of a=13.67, b=10 based on FIG. 6.

When adjusting the value of parameter a and b of the scheme in the first embodiment of the present disclosure, and selecting $M_H(k)=\min\{2^M-1, \operatorname{round}(13.67\cdot\lg(m_H(k)))\}$, a=13.67, b=10, c=0, $N_b$=8, M=3, FIG. 11 shows the comparison result for both on channel D at 20 MHz. It can be seen from FIG. 11 that performance of both schemes still keep the same or similar.

After $\tilde{H}_{eff}(k)$ is recovered, the receiving terminal could calculate the pre-coding matrix $Q_k$ of the sub-carrier based on $\tilde{H}_{eff}(k)$. Since the $\tilde{H}_{eff}(k)$ recovered by the above method in the first embodiment of the present disclosure has similar performance with $\tilde{H}_{eff}(k)$ recovered by use of IEEE802.11n, the $Q_k$ calculated using both schemes would result in similar accuracy.

Figure 12:
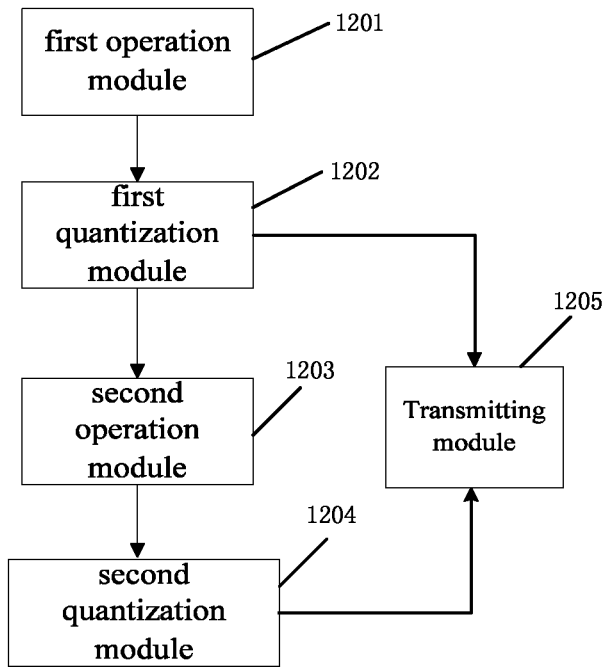
FIG. 12 illustrates the apparatus for transmitting Channel State Information in the embodiment of the present disclosure.

The embodiment of the present disclosure also provides an apparatus for transmitting CSI, as shown in FIG. 12. The apparatus for transmitting CSI may be a computation terminal including at least a processor, a memory, one or more antennas, and one or more program modules stored in the memory. When being executed by the processor, the one or more program modules may implement functions for transmitting CSI. The one or more program modules includes the following components: a first operation module 1201, used for calculating the maximum value $m_H(k)$ of the real part and imaginary part of each element in CSI matrix $H_{eff}(k)$ of the sub-carrier; a first quantization module 1202, used for carrying out M bit quantization to $m_H(k)$ to obtain the quantization amplitude $M_H(k)$; a second operation module 1203, used for calculating the linear portion $M_H^{lin}(k)$ of $M_H(k)$; a second quantization module 1204, used for carrying out $N_b$ bit quantization to real part and imaginary part of each element in $N_{eff}(k)$ respectively by $M_H^{lin}(k)$, thus to obtain the quantized CSI matrix $H_{eff}^{q}(k)$; $N_b$ being a positive integer; and a transmitting module 1205, used for transmitting said quantization amplitude $M_H(k)$ and said quantized CSI matrix $H_{eff}^q(k)$.

Optionally, the first quantization module 1202, carries out M bit quantization to $m_H(k)$ based on $M_H(k)=\min\{2^M-1, f(g(m_H(k)))\}$, wherein $M_H(k)$ is used for calculating the minimum value of $(2^M-1)$ and $f(g(m_H(k)))$; the function $f(g(m_H(k)))$ refers to the round operation of the calculation result of $g(m_H(k))$ $g(m_H(k))$ is used for mapping the linear $m_H(k)$ to the interval from a natural number to logarithm; and M is a positive integer.

Optionally, $g(m_H(k))=\max(0, a\cdot\log_b(m_H(k)+c))$, a, b and c are positive real numbers.

Optionally, said second operation module 1203 calculates the linear portion $M_H^{lin}(k)$ of $M_H(k)$ based on $M_H^{lin}(k)=b^{M_H(k)/a}$.

Optionally, said round operation could be top round operation, down round operation or round operation. Optionally, $M\geq 2$. Optionally, $M=3$. Optionally, $a=4.11$, $b=2$, $c=0$. Optionally, $a=13.67$, $b=10$, $c=0$. Optionally, said second quantization module 1204 could use the following formula $$H_{eff(m,l)}^{q(R)} = \text{sign}(H_{eff(m,l)}(k)) * \min\left(2^{N_b-1}-1, \text{round}\left(\frac{|\text{Re}(H_{eff(m,l)}(k))|}{M_H^{lin}(k)-c}(2^{N_b-1}-1)\right)\right);$$

$$H_{eff(m,l)}^{q(I)} = \text{sign}(H_{eff(m,l)}(k)) * \min\left(2^{N_b-1}-1, \text{round}\left(\frac{|\text{Im}(H_{eff(m,l)}(k))|}{M_H^{lin}(k)-c}(2^{N_b-1}-1)\right)\right);$$

to carry out the $N_b$ bit quantization to real part and imaginary part of each element in $H_{eff}(k)$ respectively, wherein $H_{eff(m,l)}(k)$ refers to the element in $H_{eff}(k)$; $H_{eff(m,l)}^{q(R)}(k)$ refers to the real part after quantization of $H_{eff(m,l)}(k)$; $H_{eff(m,l)}^{q(I)}(k)$ refers to the imaginary part after quantization of $H_{eff(m,l)}(k)$; m refers to the line position parameter, l refers to the column position parameter; $\text{sign}(H_{eff(m,l)}(k))$ refers to the sign polarity of $H_{eff(m,l)}(k)$;

$$\min\left(2^{N_b-1}-1, \text{round}\left(\frac{|\text{Re}(H_{eff(m,l)}(k))|}{M_H^{lin}(k)-c}(2^{N_b-1}-1)\right)\right)$$

refers to the minimum value between $(2^{N_b-1}-1)$ and $$\text{round}\left(\frac{|\text{Re}(H_{eff(m,l)}(k))|}{M_H^{lin}(k)-c}(2^{N_b-1}-1)\right);$$

round refers to the round operation; "| |" refers to the absolute operation; $N_b$ is the positive integer.

Optionally, the value of $N_b$ can be one of 4, 5, 6, 8, 10 and 12. Optionally, said transmitting module 1205, transmits the quantization amplitude $M_H(k)$ of each sub-carrier in sub-carrier set that needs CSI feedback, together with the quantized CSI matrix.

Figure 13:
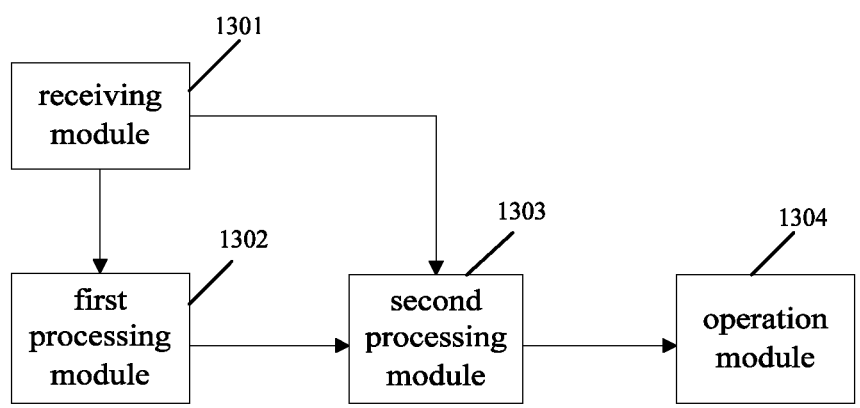
FIG. 13 illustrates the apparatus for receiving Channel State Information in the embodiment of the present disclosure.

The embodiment of the present disclosure also provided an apparatus for receiving CSI, as shown in FIG. 13, including: at least a processor, a memory, one or more antennas, and one or more program modules stored in the memory. When being executed by the processor, the one or more program modules may implement functions for receiving CSI. The one or more program modules may include a receiving module 1301, used for receiving the CSI matrix $H_{eff}^q(k)$ and quantization amplitude $M_H(k)$ of the quantized sub-carrier transmitted by the apparatus for transmitting shown in FIG. 12; a first processing module 1302, used for recovering the amplitude value $r^{(k)}$ according to $M_H(k)$; and a second processing module 1303, used for carrying out zoom of real part and imaginary part of each element in $H_{eff}^q(k)$ according to $r(k)$, thus to recover the CSI matrix $\tilde{H}_{eff}(k)$ of the sub-carrier.

Optionally, said first processing module 1302 executes a reverse processing according to the method for quantization based on $M_H(k)$ to recover the amplitude value $r(k)$.

For instance, when $M_H(k)$ adopts quantization of $M_H(k)=\min\{2^M-1, f(g(m_H(k)))\}$, the above formula (12) may be used to calculate $r(k)$.

Optionally, said second processing module 1303, uses the formula $$\text{Re}(\tilde{H}_{eff(m,l)}(k)) = \frac{r(k)H_{eff(m,l)}^{q(R)}(k)}{(2^{N_b-1}-1)}$$

$$\text{Im}(\tilde{H}_{eff(m,l)}(k)) = \frac{r(k)H_{eff(m,l)}^{q(I)}(k)}{(2^{N_b-1}-1)}$$

to carry out zoom of real part and imaginary of each element in $H_{eff}^q(k)$ wherein, $\tilde{H}_{eff(m,l)}(k)$ refers to the element in $\tilde{H}_{eff}(k)$, $\text{Re}(\tilde{H}_{eff(m,l)}(k))$ refers to the real part of $\tilde{H}_{eff(m,l)}(k)$, $\text{Im}(\tilde{H}_{eff(m,l)}(k))$ refers to the imaginary part of $\tilde{H}_{eff(m,l)}(k)$, $H_{eff(m,l)}^q(k)$ refers to the element in $H_{eff}^q(k)$, $H_{eff(m,l)}^{q(R)}(k)$ refers to the real part of $H_{eff(m,l)}^q(k)$; $H_{eff(m,l)}^{q(I)}(k)$ refers to the imaginary part of $H_{eff(m,l)}^q(k)$; m is line position parameter, is column position parameter, and quantization bit $N_b$ is positive integer.

Optionally, said apparatus for receiving CSI also includes an operation module 1304, which determines the pre-coding matrix $Q_k$ of the sub-carrier according to $\tilde{H}_{eff}(k)$.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for transmitting Channel State Information (CSI) from a user station to an access point in a MIMO (multiple input, multiple output) system, the user station and the access point each being a computation system including at least a processor, a memory, and one or more antennas, comprising:
   determining a maximum value $m_H(k)$ of a real part and an imaginary part of an element in a CSI matrix $H_{eff}(k)$ of a sub-carrier;
   determining M bit quantization of the maximum value $m_H(k)$ to obtain a quantization amplitude $M_H(k)$ without using a divisional operation for reducing algorithm complexity;
   determining a linear portion $M_H^{lin}(k)$ of the quantization amplitude $M_H(k)$;
   determining $N_b$ bit quantization of a real part and an imaginary part of each element in the CSI matrix $H_{eff}(k)$ using the determined linear portion $M_H^{lin}(k)$;
   determining a quantized CSI matrix $H_{eff}^q(k)$; and sending only the quantization amplitude $M_H(k)$ and the quantized CSI matrix $H_{eff}^q(k)$ for reducing feedback overhead while maintaining quantized feedback performance.

2. The method of claim 1, determining M bit quantization of the maximum value further comprising:

$$M_H(k)=\min\{2^M-1, f(g(m_H(k)))\};$$

wherein $M_H(k)$ is a minimum value between $(2^M-1)$ and $f(g(m_H(k)))$; $f(g(m_H(k)))$ refers to a round operation of a calculation result of $g(m_H(k))$; and $g(m_H(k))$ maps the linear portion $m_H(k)$ from an interval of natural numbers to an interval of logarithmic numbers.

3. The method of claim 2, wherein $g(m_H(k))=\max(0, a \cdot \log_b(m_H(k)+c))$; and a, b and c are positive real numbers.

4. The method of claim 3, further comprising: determining the linear portion $M_H^{lin}(k)$ of $M_H(k)$ using a formula $M_H^{lin}(k)=b^{M_H(k)/a}$.

5. The method of claim 3, wherein a=4.11, b=2, c=0; or a=13.67, b=10, c=0.

6. The method of claim 1, wherein M>1.

7. The method of claim 6, wherein M=3.

8. The method of claim 1, wherein $N_b$ is one of 4, 5, 6, 8, 10 and 12.

9. The method of claim 1, determining $N_b$ bit quantization $M_H^{lin}(k)$ of the real part and imaginary part of each element in $H_{eff}(k)$ respectively further comprising:

$$H_{eff(m,l)}^{q(R)} = \text{sign}(H_{eff(m,l)}(k)) * \min\left(2^{N_b-1}-1, \text{round}\left(\frac{|\text{Re}(H_{eff(m,l)}(k))|}{M_H^{lin}(k)-c}(2^{N_b-1}-1)\right)\right);$$

$$H_{eff(m,l)}^{q(I)} = \text{sign}(H_{eff(m,l)}(k)) * \min\left(2^{N_b-1}-1, \text{round}\left(\frac{|\text{Im}(H_{eff(m,l)}(k))|}{M_H^{lin}(k)-c}(2^{N_b-1}-1)\right)\right);$$

wherein $H_{eff(m,l)}(k)$ refers to an element in $H_{eff}(k)$, $H_{eff(m,l)}^{q(R)}$ refers to a real part of the quantized $H_{eff(m,l)}(k)$; $H_{eff(m,l)}^{q(I)}(k)$ refers to an imaginary part of the quantized $H_{eff(m,l)}(k)$; m is a line position parameter, l is a column position parameter; $\text{sign}(H_{eff(m,l)}(k))$ refers to a polarity sign of $H_{eff(m,l)}(k)$;

$$\min\left(2^{N_b-1}-1, \text{round}\left(\frac{|\text{Re}(H_{eff(m,l)}(k))|}{M_H^{lin}(k)-c}(2^{N_b-1}-1)\right)\right)$$

refers to a minimum value between $(2^{N_b-1}-1)$ and $$\text{round}\left(\frac{|\text{Re}(H_{eff(m,l)}(k))|}{M_H^{lin}(k)-c}(2^{N_b-1}-1)\right);$$

round refers to a round operation; "| |" refers to an absolute operation; $N_b$ is a positive integer; and c is a positive real number.

10. The method of claim 1, further comprising: sending a quantization amplitude $M_H(k)$ of each sub-carrier in a sub-carrier set that requires CSI feedback together with the quantized CSI matrix $H_{eff}^q(k)$.

11. A method for receiving Channel State Information (CSI) by an access point from a user station in a MIMO (multiple input, multiple output) system, the user station and the access point each being a computation system including at least a processor, a memory, and one or more antennas, comprising:

receiving only a quantized CSI matrix $H_{eff}^q(k)$ and a quantization amplitude $M_H(k)$ of a sub-carrier;
recovering an amplitude value r(k) based on $M_H(k)$;
determining a real part and an imaginary part of each element in $H_{eff}^q(k)$ based on r(k); and
recovering the CSI matrix $\tilde{H}_{eff}(k)$ of the sub-carrier;
wherein the method for receiving CSI reduces both algorithm complexity and feedback overhead while maintaining quantized feedback performance.

12. An apparatus for transmitting Channel State Information (CSI) in a MIMO (multiple input, multiple output) system, comprising at least a processor, a memory, and one or more antennas, the processor being configured to:

determine a maximum value $m_H(k)$ in a real part and an imaginary part of each element of a CSI matrix $H_{eff}(k)$ of a sub-carrier;
determine M bit quantization of $m_H(k)$ to obtain a quantization amplitude $M_H(k)$ without using a divisional operation for reducing algorithm complexity, M being a positive integer;
determine a linear portion $M_H^{lin}(k)$ of $M_H(k)$;
determine $N_b$ bit quantization of a real part and an imaginary part of each element in the CSI matrix $H_{eff}(k)$ based on the linear portion $M_H^{lin}(k)$, and to obtain a quantized CSI matrix $H_{eff}^q(k)$, $N_b$ being a positive integer; and
send said quantization amplitude $M_H(k)$ and said quantized CSI $H_{eff}^q(k)$ only for reducing feedback overhead while maintaining quantized feedback performance.

13. The apparatus for transmitting CSI according to claim 12, wherein the processor is further configured to determine M bit quantization to $m_H(k)$ based on $M_H(k)=\min\{2^M-1, f(g(m_H(k)))\}$; $M_H(k)$ being the minimum value between $(2^M-1)$ and $f(g(m_H(k)))$, a function $f(g(m_H(k)))$ being the round operation of the calculation result of $g(m_H(k))$, a function $g(m_H(k))$ mapping the linear $m_H(k)$ from an interval of natural numbers to an interval of logarithmic numbers, and M being a positive integer.

14. The apparatus for transmitting CSI according to claim 13, wherein:
$g(m_H(k))=\max(0, a \cdot \log_b(m_H(k)+c))$; and a, b and c are positive real numbers.

15. The apparatus for transmitting CSI according to claim 14, wherein a=4.11, b=2, c=0; or a=13.67, b=10, c=0.

16. The apparatus for transmitting CSI according to claim 12, wherein: the second operation module is further configured to determine the linear portion $M_H^{lin}(k)$ of $M_H(k)$ according to the formula $M_H^{lin}(k)=b^{M_H(k)/a}$.

17. The apparatus for transmitting CSI according to claim 12, wherein M=3.

18. The apparatus for transmitting CSI according to claim 12, wherein $N_b$ is one of 4, 5, 6, 8, 10 and 12.

19. The apparatus for transmitting CSI according to claim 12, wherein the processor is further configured to use the following formula to determine $N_b$ bit quantization of a real part and an imaginary part of each element in $H_{eff}(k)$;

$$H_{eff(m,l)}^{q(R)} = \text{sign}(H_{eff(m,l)}(k)) * \min\left(2^{N_b-1}-1, \text{round}\left(\frac{|\text{Re}(H_{eff(m,l)}(k))|}{M_H^{lin}(k)-c}(2^{N_b-1}-1)\right)\right);$$

$$H_{eff(m,l)}^{q(I)} = \text{sign}(H_{eff(m,l)}(k)) * \min\left(2^{N_b-1}-1, \text{round}\left(\frac{|\text{Im}(H_{eff(m,l)}(k))|}{M_H^{lin}(k)-c}(2^{N_b-1}-1)\right)\right);$$

$H_{eff(m,l)}(k)$ being the element in $H_{eff}(k)$; $H_{eff(m,l)}^{q(R)}$ being the real part of quantized $H_{eff(m,l)}(k)$; $H_{eff(m,l)}^{q(I)}(k)$ being the imaginary part of quantized $H_{eff(m,l)}(k)$; m being a line position parameter, l being a column position parameter; sign($H_{eff(m,l)}(k)$) being a polarity sign of $H_{eff(m,l)}(k)$;

$$\min\left(2^{N_b-1}-1, \text{round}\left(\frac{|\text{Re}(H_{eff(m,l)}(k))|}{M_H^{lin}(k)-c}(2^{N_b-1}-1)\right)\right)$$

being the minimum value between $(2^{N_b-1}-1)$ and $$\text{round}\left(\frac{|\text{Re}(H_{eff(m,l)}(k))|}{M_H^{lin}(k)-c}(2^{N_b-1}-1)\right);$$

round being a round operation; "| |" being an absolute operation; $N_b$ being a positive integer; c being a positive real number.

20. An apparatus for receiving Channel State Information (CSI), comprising: at least a processor, a memory, and one or more antennas, the processor being configured to:
 receive only a quantized CSI $H_{eff}^q(k)$ and a quantization amplitude $M_H(k)$ of a sub-carrier;
 recover an amplitude value r(k) based on the amplitude $M_H(k)$; and
 determine a real part and an imaginary part of each element in $H_{eff}^q(k)$ based on the amplitude r(k), and to recover a CSI matrix $\tilde{H}_{eff}(k)$ of the sub-carrier;
 wherein the apparatus for receiving CSI reduces both algorithm complexity and feedback overhead while maintaining quantized feedback performance.

* * * * *